Jan. 23, 1945. J. A. SMITH 2,367,807
STORAGE BATTERY CONSTRUCTION
Filed Feb. 18, 1942
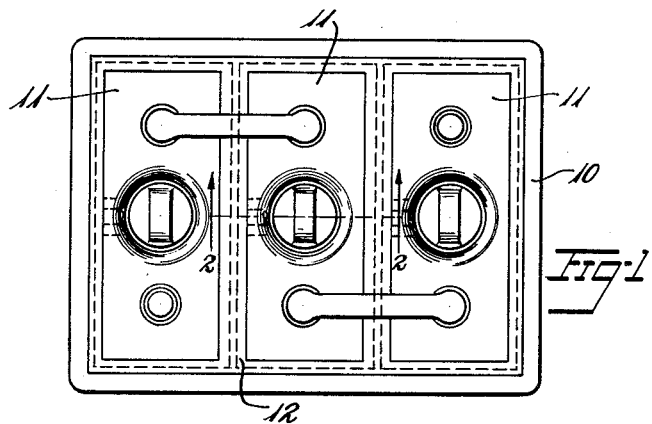
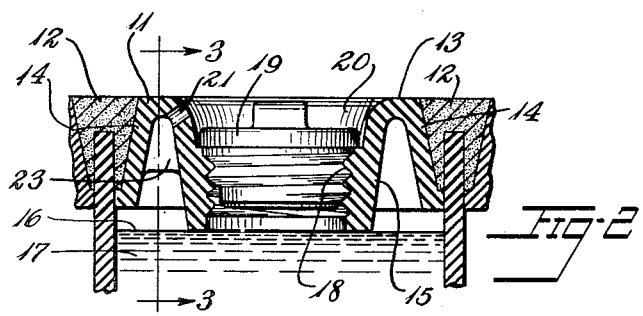
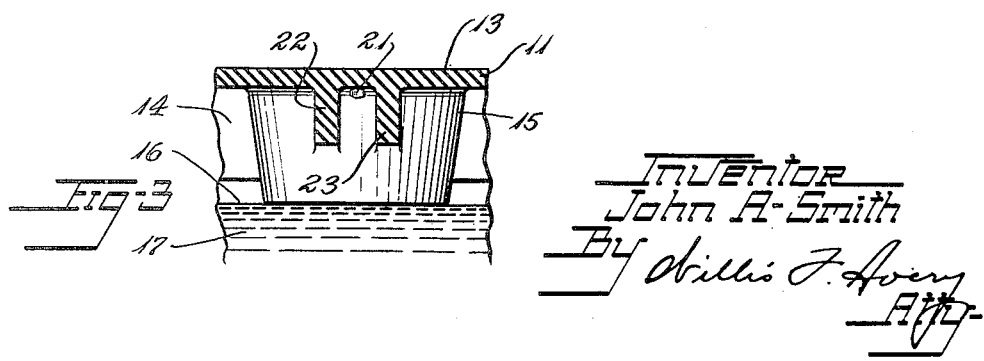
Inventor
John A. Smith
By Willis F. Avery
Atty.

Patented Jan. 23, 1945

2,367,807

UNITED STATES PATENT OFFICE 2,367,807

STORAGE BATTERY CONSTRUCTION

John A. Smith, Arlington, Mass., assignor to The B. F. Goodrich Company, New York, N. Y., a corporation of New York Application February 18, 1942, Serial No. 431,411

4 Claims. (Cl. 136—177)

This invention relates to storage battery construction and more specifically to battery cover construction to facilitate inspection and proper filling of the cells.

In prior constructions, it has been difficult to determine when the battery was properly filled owing to the difficulty in seeing the surface of the electrolyte, and difficulties have been experienced because of overflow of the electrolyte. The filler opening commonly has been small in diameter as compared to depth, and it has been difficult for the attendant to see when the battery was properly filled. Venting for the escape of gas often has been such that electrolyte has splashed onto the top of the cover where it has had to remain until wiped up or until it has leaked onto adjoining structures with resulting damage from the acid.

The present invention aims to overcome these and other difficulties.

The principal objects of the invention are to provide for facilitating a clear view of the electrolyte level, to provide for venting the battery at a position below the top of the cover, to provide a catch basin above the closure member, to reduce splasing of electrolyte onto the cover, and to provide for facilitating the avoidance of overfilling. These and other objects will appear from the following description and the accompanying drawing.

Of the drawing,

Fig. 1 is a plan view of a three-cell storage battery embodying and illustrating the invention.

Fig. 2 is a cross-sectional view thereof taken on line 2—2 of Fig. 1, parts being broken away.

Fig. 3 is a cross-sectional view taken on line 3—3 of Fig. 2, parts being broken away.

In accordance with the invention a cover for an electrolyte container is formed with a large vent and filler opening therethrough surrounded by a depending skirt integral with the cover and defining an opening having an adequately large diameter as compared to its depth to afford good visibility of the normal electrolyte level, the lower portion of the skirt is adapted to engage a closure member defining with the skirt a basin for catching overflow, a vent opening is formed through the skirt above the closure and communicates between the basin and a gas trapping space around said skirt below the cover, and separating partitions preferably of less depth than the filler well are provided immediately adjacent the vent opening beneath the cover and function as a barrier to resist leakage through the vent opening of splashing electrolyte.

Referring to the drawing which shows an illustrative embodiment of the invention, the numeral 10 designates a battery container divided to provide three cells, each having a cover 11 sealed in place by a body 12 of thermoplastic material. Each cell cover 11 has a relatively flat top wall 12 which may be flush with top of the container, and side walls 14 depending therefrom and flared outwardly to close the cell by engagement with the cell walls. An annular skirt 15 is formed integrally with the cover and depends from the top wall to the normal level 16 of the electrolyte 17 and defines a vent and filler well opening through the cover. The lower portion of the filler wall skirt is internally threaded, as at 18 to engage a threaded closure member 19 of less depth than the well, while the unthreaded portion 20 above the closure member defines with the closure member a basin for receiving overflow of electrolyte from splashing as hereinafter described. The unthreaded upper portion of the skirt is perforated as at 21 to provide a vent communicating with the space about the vent and filled well and below the top wall of the cover to permit escape of gases to the exposed basin.

To minimize escape of electrolyte due to splashing, vertical partitions or baffles 22, 23 are provided extending at each side of the vent opening 21 integral with and between the skirt 15 and the side wall 14 of the cover and depending downwardly from the top wall of the cover preferably to approximately half the distance between the top wall and the normal surface of the electrolyte. These partitions also have the advantage of separating the vented space between the partitions from the remaining space beneath the cover and around the filler well when the level of the electrolyte is at or above the bottom of the partitions thereby providing a gas trapping space preventing complete filling.

The construction and arrangement are such that, with the closure plug removed, the attendant can readily see the surface of the electrolyte, when adding liquid thereto, due to the width of the filler opening and the closeness of the normal electrolyte level to the top of the cover, and can stop adding liquid when the surface of the liquid reaches the bottom of the vent and filler well which he can determine by reflection of light from the surface of the liquid.

Should the attendant continue to add liquid beyond the normal level, air will trap around the filling well above the partitions 22, 23 and beneath the cover preventing any substantial filling of that space beyond the bottoms of the partitions with the result that very little additional liquid could be added without overflow of the battery and the attendant will naturally remove excess before inserting the closure member.

After the closure member, which need have no vent hole, is in place venting can take place only through the vent 21 into the basin above the closure member, and any flow of liquid discharged from the vent opening by splashing will be caught in the basin, the partitions 22, 23 minimizing loss of electrolyte due to splashing. The depressed nature of the basin facilitates flow into the cell of electrolyte which for any reason may be deposited upon the cover, so that the latter may be kept dry and clean.

While the battery is shown as a three-cell battery, the invention is applicable to batteries having one cell or any number of cells and a single cover may extend over one or more cells with a vent and filler well for each cell.

Variations may be made without departing from the scope of the invention as it is defined by the following claims.

I claim:

1. A cover assembly for a container for electrolyte comprising a cover having an upwardly flared skirt integral therewith defining a vent and filler opening therethrough and depending below the cover for providing between the cover and a normal electrolyte level a space outside said skirt beneath said cover, an imperforate closure member adapted to seal the lower portion of said vent and filler opening with an upper surface of the closure member below the upper face of the cover and providing with said skirt a basin having a closed bottom when the closure is in sealing position, and vent opening means through said skirt above said closure member providing the sole passage communicating between said space and said basin when the closure member is in place.

2. A cover assembly for a container for electrolyte comprising a cover having an upwardly flared skirt integral therewith defining a vent and filler opening therethrough and depending below the cover for providing between the cover and a normal electrolyte level a space outside said skirt beneath said cover, an imperforate closure member adapted to seal the lower portion of said vent and filler opening with an upper surface of the closure member below the upper surface of the cover and providing with said skirt a basin having a closed bottom when the closure is in sealing position, vent opening means through said skirt above said closure member providing the sole passage communicating between said space and said basin when the closure member is in place, and partitions in said space adjacent said vent opening means to resist splashing of the electrolyte into said vent opening means.

3. A cover assembly for a container for electrolyte comprising a cover having an upwardly flared skirt integral therewith defining a vent and filler opening therethrough and depending below the cover for providing between the cover and a normal electrolyte level a space outside said skirt beneath the said cover, an imperforate closure member adapted to seal the lower portion of said vent and filler opening with an upper surface of the closure member below the upper surface of the cover and providing with said skirt a basin having a closed bottom when the closure is in sealing position, vent opening means through said skirt above said closure member providing the sole passage communicating between said space and said basin when the closure member is in place, and partitions in said space adjacent said vent opening means extending downwardly from said cover and integral with said skirt to resist splashing of the electrolyte into said vent opening means.

4. A cover assembly for a container for electrolyte comprising a cover having a side wall and spaced therefrom an upwardly flared skirt integral with the cover defining a vent and filler opening therethrough and depending below the cover for providing between the cover, the sidewall and a normal electrolyte level a space beneath said cover, an imperforate closure member adapted to seal the lower portion of said vent and filler opening with an upper surface of the closure member below the upper surface of the cover and providing with said skirt a basin having a closed bottom when the closure is in sealing position, said skirt having vent opening means through it above said closure member providing the sole passage communicating between said space and said basin when the closure member is in place, and partitions in said space adjacent said vent opening means extending downwardly from said cover and connecting said skirt and sidewall of the cover to resist splashing of the electrolyte into said vent opening means and providing a gas trapping space adjacent said skirt between the cover and the electrolyte upon rise of the latter to the bottoms of said partitions.

JOHN A. SMITH.